(12) United States Patent
Volkwein et al.

(10) Patent No.: US 8,113,047 B2
(45) Date of Patent: Feb. 14, 2012

(54) ULTRASONIC MEASURING DEVICE FOR A CONTAINER

(75) Inventors: Thomas Volkwein, Pliening (DE); Lars Bornemann, Breitbrunn (DE)

(73) Assignee: Truma Geratetechnik GmbH & Co. KG, Putzbrunn (DE)

( * ) Notice: Subject to any disclaimer, the term of this patent is extended or adjusted under 35 U.S.C. 154(b) by 618 days.

(21) Appl. No.: 11/792,887

(22) PCT Filed: Dec. 9, 2005

(86) PCT No.: PCT/EP2005/013256
§ 371 (c)(1),
(2), (4) Date: Apr. 6, 2009

(87) PCT Pub. No.: WO2006/063742
PCT Pub. Date: Jun. 22, 2006

(65) Prior Publication Data
US 2009/0205419 A1    Aug. 20, 2009

(30) Foreign Application Priority Data
Dec. 13, 2004   (DE) .......................... 10 2004 059 964

(51) Int. Cl.
*G01F 23/00*   (2006.01)
(52) U.S. Cl. ...................................... 73/290 V
(58) Field of Classification Search .................. 73/290 V
See application file for complete search history.

(56) References Cited

U.S. PATENT DOCUMENTS

| | | | |
|---|---|---|---|
| 4,320,659 A | 3/1982 | Lynnworth et al. | |
| 4,901,245 A * | 2/1990 | Olson et al. | 702/54 |
| 5,163,323 A * | 11/1992 | Davidson | 73/290 V |
| 5,438,868 A | 8/1995 | Holden et al. | |
| 6,634,234 B1 * | 10/2003 | Haas | 73/618 |

FOREIGN PATENT DOCUMENTS

| | | |
|---|---|---|
| DE | 42 23 346 | 1/1994 |
| DE | 42 34 300 | 4/1994 |
| DE | 43 08 373 | 9/1994 |
| DE | 692 17 994 | 9/1997 |
| DE | 196 43 956 | 5/1998 |
| DE | 299 12 072 | 11/1999 |
| DE | 103 12 100 | 9/2004 |
| DE | 103 26 159 | 12/2004 |
| EP | 0 556 557 | 8/1993 |
| EP | 0 961 106 | 12/1999 |
| JP | 05133792 | 5/1993 |
| JP | 05273033 | 10/1993 |

* cited by examiner

*Primary Examiner* — Hezron E Williams
*Assistant Examiner* — Nathaniel Kolb
(74) *Attorney, Agent, or Firm* — D. Peter Hochberg; Sean F. Mellino; Daniel J. Smola

(57) ABSTRACT

The invention relates to an ultrasound measuring device for a container. A coupling device supporting an ultrasound transducer serves for coupling and asymmetric alignment of the ultrasound transducer with respect to the container. This causes a sound field of the interfering signal in an ultrasound measurement to propagate within the container in an asymmetric fashion with respect to planes of symmetry of the container, whereby the interfering signal that is received at the site of injection is attenuated relative to a useful signal.

7 Claims, 7 Drawing Sheets

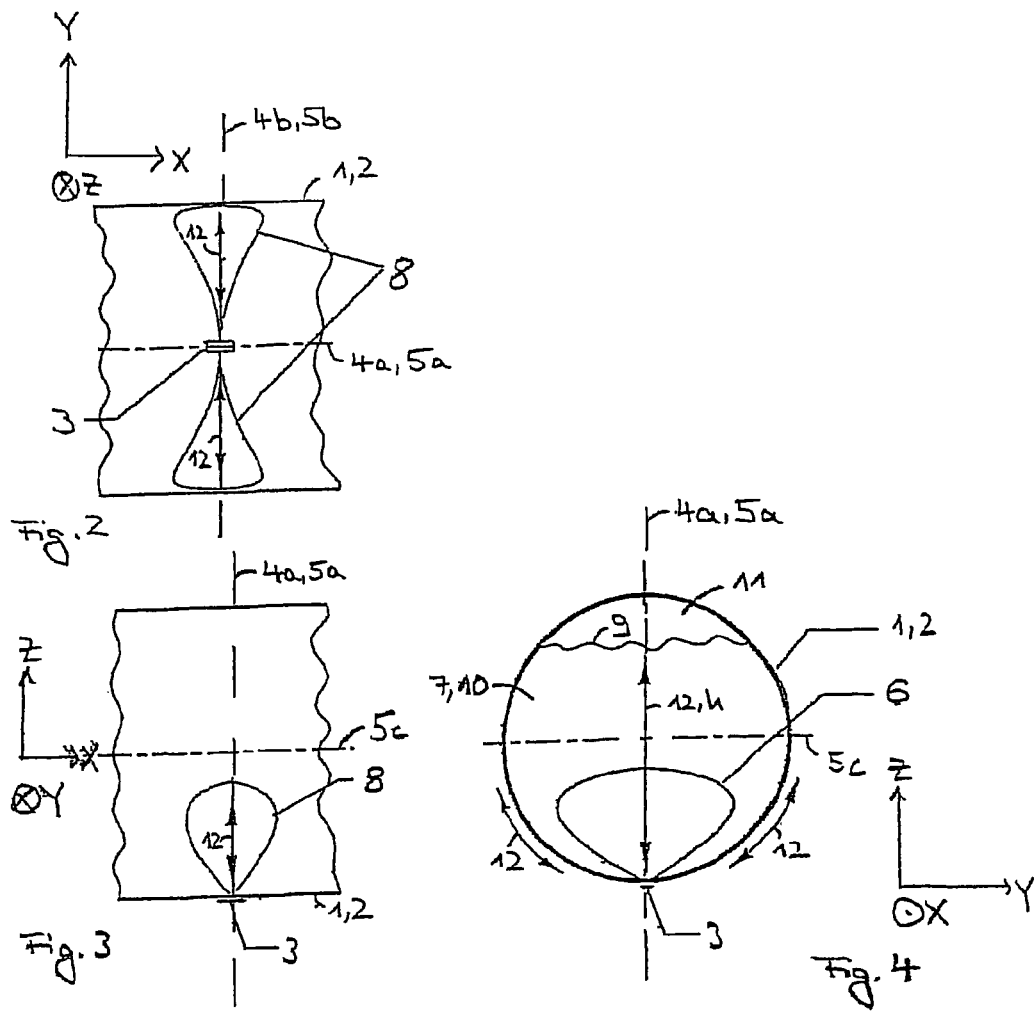
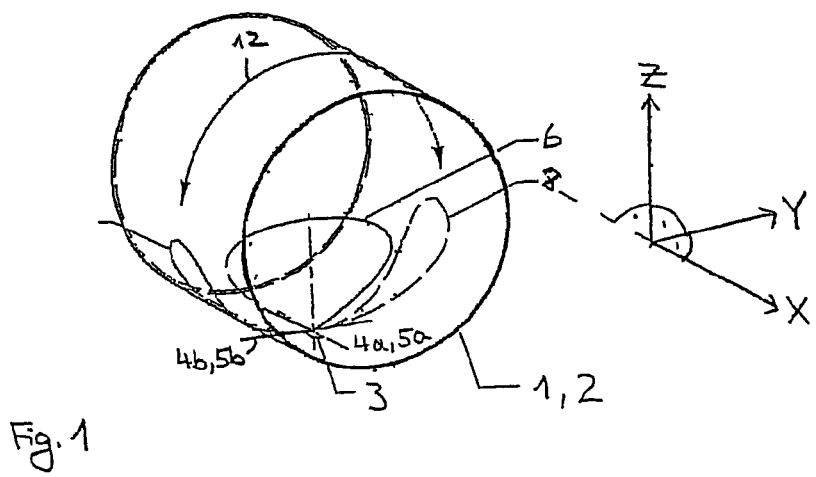

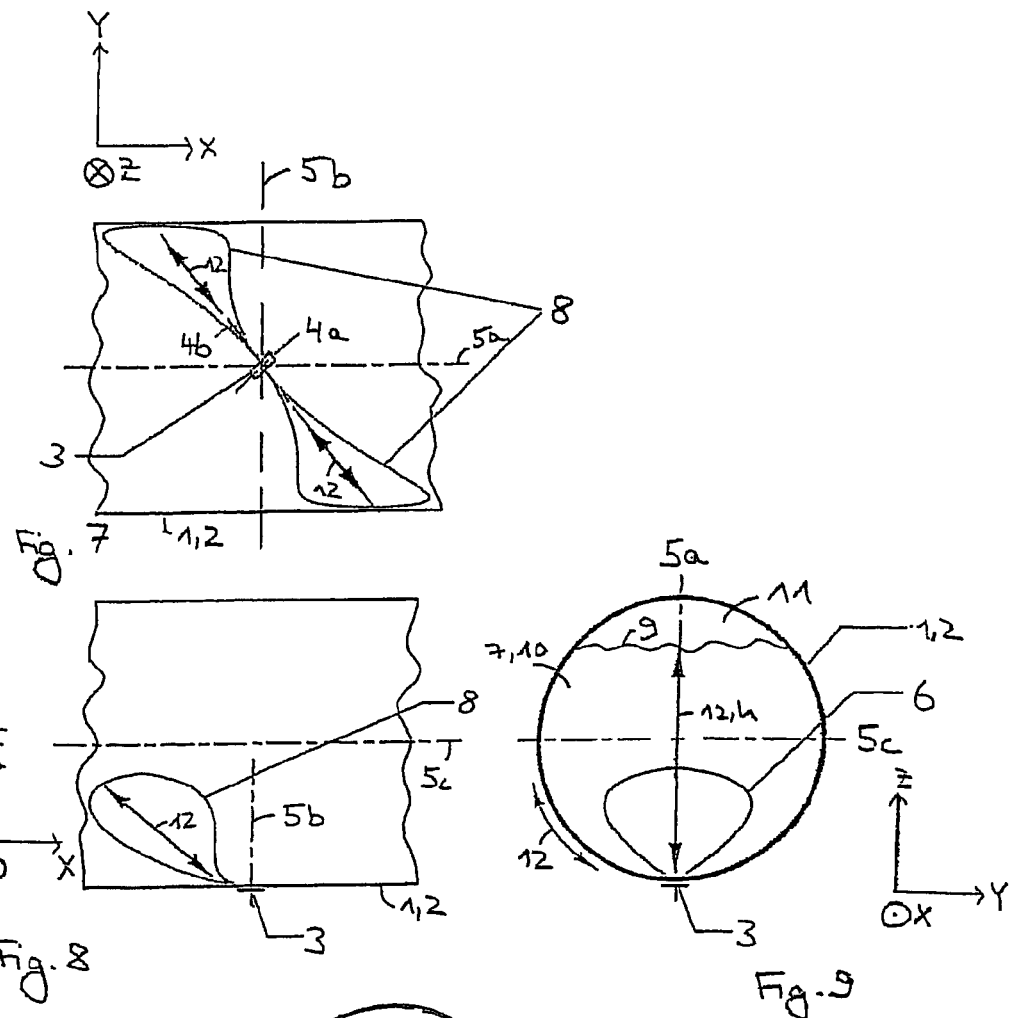
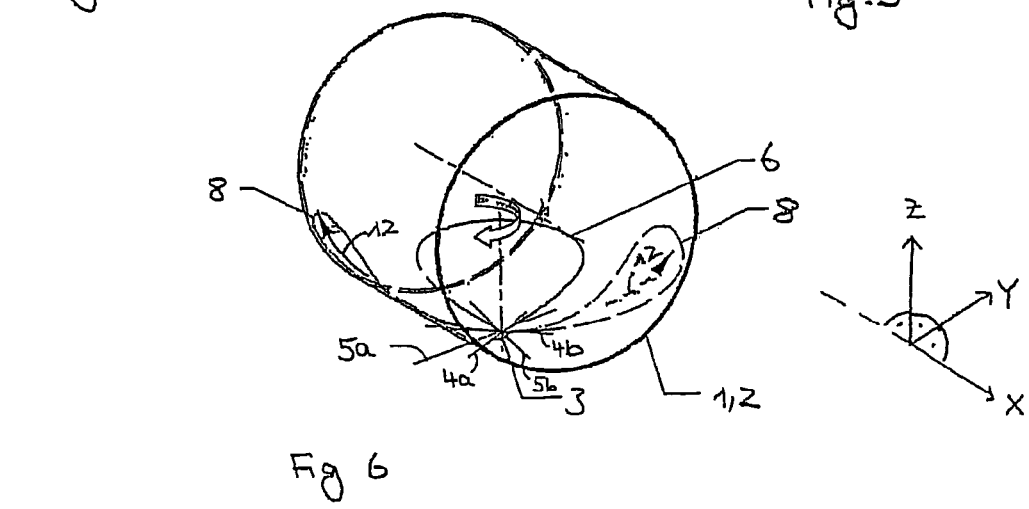

ULTRASONIC MEASURING DEVICE FOR A CONTAINER

CROSS-REFERENCE TO RELATED APPLICATION

This application is a National Stage application of International Application No. PCT/EP2005/013256, filed on Dec. 9, 2005, which claims priority of German application No. 10 2004 059 964.5 filed on Dec. 13, 2004.

BACKGROUND OF THE INVENTION

The invention relates to an ultrasound measuring device for a container and a method for determining a useful signal from an ultrasound signal having an interfering signal superimposed on it.

Closed gas bottles having a liquid content have numerous applications in industry and everyday life such as as fuel gas bottles for forklift trucks or as gas bottles supplying energy for camping. Ultrasound measurements for determining the filling level of the gas bottles permit simple and cost-efficient maintenance. A filling level measuring apparatus operating with ultrasound is known, for example, from EP-A-0955529. The apparatus permits filling level control for fuel gas-driven forklift trucks by ultrasound measurement. Therefore, this allows any unnecessary replacement of partially emptied bottles of forklift trucks or breakdown due to empty fuel gas bottles to be prevented.

Published subsequently, DE-A-103 31 044 concerns the support device for a container and for a filling level measuring facility for measuring the filling level of a medium that is present in the container. The coupling/holding device comprises a container receptacle and a locking facility that can be switched between at least one open position, in which the container is freely mobile, and one closed position, in which the container is locked in the container receptacle. In this context, the filling level measuring facility, being in the closed position, can be pressed against an external wall of the container and can be moved away from the container in the open position. No additional action by a user is required for this purpose, i.e. the pressing against and the removal proceed automatically upon opening and closing of the locking facility.

In ultrasound measuring devices of this type, an ultrasound transducer is used to inject an ultrasound signal from below through the container wall into the medium. Once the ultrasound signal travels through the medium up to a filling level, it is reflected at a phase boundary and returns to the ultrasound transducer, whereby the phase boundary may separate, for example, the liquid/gaseous phases of a liquefied fuel gas serving as medium. The filling level can be determined from the travel time of the ultrasound signal that is reflected and received by the ultrasound transducer. However, as an undesired side effect of this ultrasound measurement, transverse waves occur upon the injection of the ultrasound into the container wall and propagate in the container wall. In terms of physics, these transverse waves are related to the elasticity of shape of the container wall that is provided in the form of a solid body. Depending on the features of the container such as geometry, wall thickness, wall structure including varnishing as well as the selected frequency of the ultrasound signal, these transverse waves occur at various strength and lead to an interfering signal that is received by the ultrasound transducer jointly with the useful signal that is reflected at the liquid/gaseous phase boundary and is suitable for determining the filling level. If the interfering signal and the useful signal are superimposed or if the interfering signal is within a possible travel time range of the useful signal serving for determining the filling level, separation of the interfering signal from the useful signal is not possible without further effort, which renders the filling level measurement considerably more difficult.

The invention is based on the object to provide an ultrasound measuring device for a container, in which the interfering signal that is elicited by the container wall in an ultrasound measurement returns to the site of injection of the ultrasound transducer either not at all or clearly attenuated and/or delayed in time as compared to a useful signal. It is another object of the invention to provide a method that can be used to determine the useful signal from an ultrasound signal on which the interfering signal is superimposed.

These objects are met according to the invention by an ultrasound measuring device according to claim 1 and by a method according to claim 12 for determining a useful signal from a ultrasound signal on which an interfering signal is superimposed. Preferred embodiments are evident from the dependent claims and/or are illustrated in the following description.

SUMMARY OF THE INVENTION

According to the invention, the ultrasound measuring device comprises an ultrasound transducer for emitting ultrasound signals into a container suited to take up a medium, and for receiving ultrasound signals from the container, whereby a coupling device supporting the ultrasound transducer serves to provide for the formation of a coupling—which is suitable for the transmission of ultrasound—between the ultrasound transducer and an external surface of the container, and provides for a predetermined alignment of ultrasound transducer and container such that the coupling of the ultrasound transducer to the container is effected in an asymmetric fashion. As a consequence, the ultrasound transducer and the container do not have a plane of symmetry in common.

For the purposes of this application, the term, planes of symmetry, of the ultrasound transducer always refers to planes of symmetry of the ultrasound head as the ultrasound generating element, i.e. for example, a vibrating membrane or piezo crystal, and does not concern planes of symmetry of the housing of the ultrasound transducer or other components. The term, planes of symmetry of the housing, explicitly refers to parts of the container also, to which the ultrasound transducer is coupled by means of the coupling device.

If, for example, an ultrasound transducer is coupled to a cylinder-shaped part of a cylinder-shaped gas bottle having a bottle neck, the cylinder-shaped part contains a cross-sectional plane as a plane of symmetry. However, this cross-sectional plane is not a plane of symmetry of the overall gas bottle having a bottle neck. Yet this plane of symmetry is defined to be a plane of symmetry of a part of the container, namely, e.g. of the cylindrical part to which the ultrasound transducer is coupled, and is compared to the planes of symmetry of the ultrasound transducer. For the purposes of this application, two planes of symmetry are defined as being common planes of symmetry if they are identical in three-dimensional space, i.e. are on top of each other. If two planes of symmetry are just parallel to each other in three-dimensional space, they are not common planes of symmetry by definition.

An alignment of the ultrasound transducer and the container which is provided to be asymmetric by means of the coupling device leads to asymmetric propagation of the ultrasound waves of the ultrasound signal within the container wall, since the planes of symmetry of the ultrasound field naturally correspond to the planes of symmetry of the ultrasound transducer. Said asymmetrical alignment thus prevents the ultrasound wave of the interfering signal from returning to the site of injection simply by directed travel around the container wall and being received there as a strong interfering signal. Moreover, asymmetric alignment facilitates so-called "extinguishing" of the wave within the container wall, whereupon the interfering signal is received either not at all, or very weak or much delayed with respect to the useful signal.

Preferably, the medium within the container is a liquid gas and the container is a gas bottle such that, for example, a suitable signal for determining the filling level of the container is reflected at the phase boundary between liquid and gas within the container to the site of injection and received at this site as the useful signal by the ultrasound transducer.

In an advantageous embodiment, the ultrasound transducer has no plane of symmetry in common with the coupling device. In this embodiment, an advantageous symmetric alignment of the coupling device with respect to the container leads to asymmetric alignment of the ultrasound transducer with respect to the container.

The container preferably comprises a cylinder-shaped part and the coupling device is provided for coupling the ultrasound transducer to the external surface of the cylinder-shaped part of the container. Particularly well-suited as container having a cylinder-shaped part is a gas bottle against which the coupling device presses the ultrasound transducer in advantageous fashion from below to the external surface of the cylinder-shaped part of the container when the gas bottle is placed in a lying-down arrangement. An arrangement of container and coupling device of this type is suitable in particular for consumption controls on the fuel gas bottles of fuel gas-operated forklift trucks.

It is advantageous to provide for fixed alignment of the ultrasound transducer with respect to the container by gluing the coupling device to the container. It is conceivable to fix the coupling device to the external surface of the container by gluing and to couple the ultrasound transducer to the external surface of the container by means of a spring force.

In a particularly advantageous embodiment, a fixed alignment of the ultrasound transducer with respect to the container can be produced by means of a coupling device that can be pressed against the container. It is advantageous to press the ultrasound transducer against the container by means of a spring force. A tension inside the spring underlying the spring force can, for example, be generated by tensioning the spring using the force generated by the weight of the container. In this context, for example, the container is placed from above on the coupling device.

It is also advantageous to provide for the ultrasound transducer being pressed against the container by means of a tensioning belt that surrounds the coupling device and the container. If the ultrasound transducer is pressed against the container by means of a spring force that can be transferred via the coupling device to the ultrasound transducer, the spring force can be set by tensioning the tensioning belt.

It is also advantageous to provide for the ultrasound transducer being pressed against the container by clamping the coupling device to the container. For example, clamping the coupling device to the container by means of magnetic forces is suitable for this purpose.

The surface of the ultrasound transducer advantageously possesses two planes of symmetry and is provided to be rectangular in shape. Providing the ultrasound transducer as described is advantageous, in particular as compared to the surface of the ultrasound transducer having a round shape, in that an asymmetry between the ultrasound transducer and the container can be provided readily, which is more difficult to achieve or cannot be achieved at all if the surface of the ultrasound transducer is round, rotationally-symmetrical, due to the planes of symmetry being present in many such cases. For example, by designing the surface of the ultrasound transducer to be round in shape and by coupling the ultrasound transducer to a cylinder-shaped part of a container, an asymmetric alignment of the ultrasound transducer and the container cannot be achieved.

In a preferred embodiment, the ultrasound transducer is a generally known thickness-mode transducer. Upon the application of an alternating current to its two electrodes, a piezoelectric thickness-mode transducer vibrates only in the direction of the line normal to the surface and undergoes longitudinal vibrations, which allows ultrasound waves to be transmitted advantageously into the wall of the container in the direction of the line normal to the electrode surface. However, it is also conceivable to design the ultrasound transducer as a shear-mode transducer, flexural resonator or any other transducer that is suitable for ultrasound transduction.

In a preferred embodiment, the ultrasound transducer comprises no plane of symmetry. This advantageously provides for a multitude of design options for fixing the ultrasound transducer within the coupling device as well as for designing the coupling device with regard to the coupling of the ultrasound transducer to the container, since the lack of a plane of symmetry of the ultrasound transducer per se is associated with an asymmetric alignment of the ultrasound transducer and the container.

The ultrasound measuring device advantageously contains a memory facility that can be used to store signals in the form of a series of measuring values, a comparing facility for various stored ultrasound signals such that an interfering signal can be determined as a series of values with said interfering signal corresponding to a measuring signal component that is common to the series of measuring values of the various ultrasound signals to be compared. Provided advantageously in the ultrasound measuring device, an analytical facility serves for determining a useful signal by subtracting the stored interfering signal from an ultrasound signal. In repeated ultrasound measurements with unchanged site of injection of the ultrasound signal, the interfering signal is a constant signal that can advantageously be determined by means of the memory facility and comparing facility in the form of a signal component that is common to various ultrasound signals. It is also conceivable to use the memory facility to store a plurality of interfering signals that are assigned to various containers. Accordingly, in ultrasound measurements in a particular container, the useful signal is determined by subtracting the interfering signal, that is assigned to the particular container and stored, from an ultrasound signal measured in the particular container. This useful signal serves, for example, for calculating the filling level of the container.

It is also conceivable to blank out the interfering signal in the measured ultrasound signal, for example by deleting, after the ultrasound measurement, the signal values in the time period in which the interfering signal occurs or is suspected to occur.

The determination of the interfering signal by means of the comparing facility and the determination of the useful signal by means of the analytical facility can also be effected by means of more comprehensive algorithms and computing rules, for example by means of filter functions.

In a preferred method for determining a useful signal from an ultrasound signal on which an interfering signal is superimposed, an ultrasound signal is initially emitted into a container that is filled with a medium up to a filling level. An ultrasound signal returning from the container is then received and stored. Emission, reception, and storing of ultrasound signals are repeated at various filling levels inside the container. Then, the interfering signal is determined as a signal component that is common to the stored ultrasound signals despite the difference in filling levels in the measurements underlying the stored ultrasound signals. The useful signal of an ultrasound measurement is then determined by subtracting the previously determined and stored interfering signal from the ultrasound signal received in the ultrasound measurement. In subsequent ultrasound measurements, the useful signals is also determined by subtracting the stored interfering signal from the ultrasound signal that is received. Accordingly, the determination of the interfering signal can be considered to be a calibration measurement with respect to a container and various containers can be calibrated by this means.

Further features and advantages of the invention are evident from the following description and reference to the drawings.

BRIEF DESCRIPTION OF THE DRAWINGS

FIG. 1 shows a schematic three-dimensional view of a container having coupled to it an ultrasound transducer according to the state of the art;

FIG. 2 shows a schematic bottom view of the arrangement shown in FIG. 1;

FIG. 3 shows a schematic side view of the arrangement shown in FIG. 1;

FIG. 4 shows a schematic front view of the arrangement shown in FIG. 1;

FIG. 6 shows a schematic three-dimensional view of a container having coupled to it an ultrasound transducer according to the invention;

FIG. 7 shows a schematic bottom view of the arrangement according to the invention shown in FIG. 6;

FIG. 8 shows a schematic side view of the arrangement according to the invention shown in FIG. 6;

FIG. 9 shows a schematic front view of the arrangement according to the invention shown in FIG. 6;

DETAILED DESCRIPTION OF THE PREFERRED EMBODIMENTS

Figure 5:
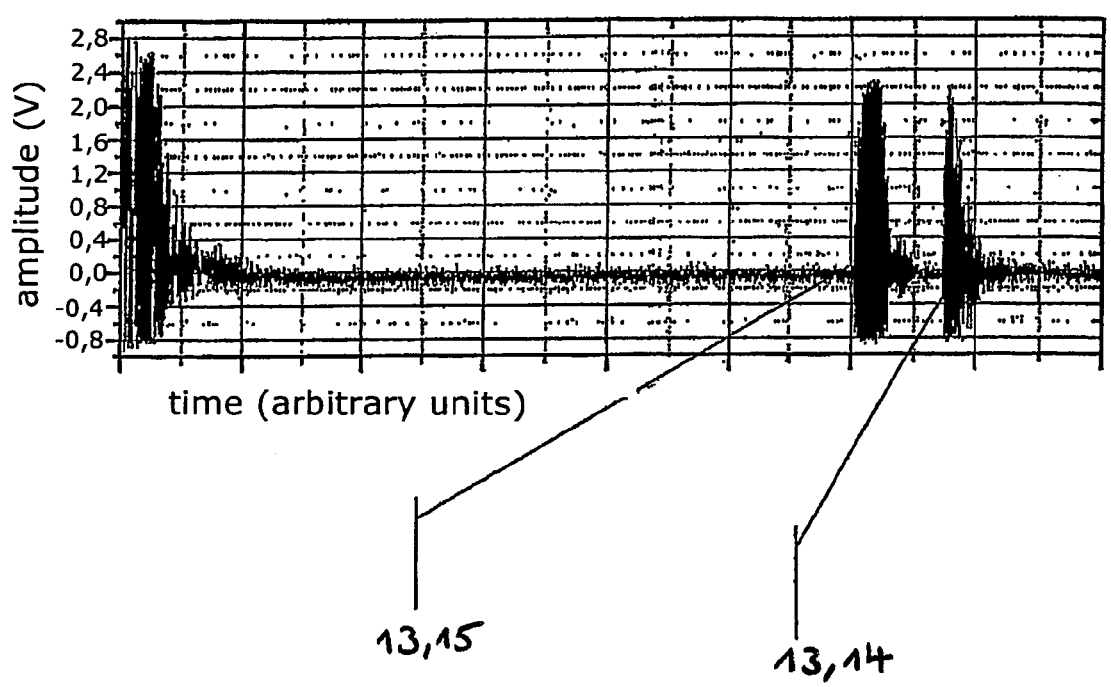
FIG. 5 shows an ultrasound signal received in an ultrasound measurement of the arrangement shown in FIG. 1.

FIG. 1 shows a schematic three-dimensional view of a cylinder-shaped part 1 of a container 2 to which an ultrasound transducer 3 is coupled according to the state of the art. FIGS. 2 to 4 show views of the arrangement shown in FIG. 1, whereby FIG. 2 is a bottom view, FIG. 3 is a schematic side view, and FIG. 4 is a schematic front view. For clarity purposes and for better presentation of the alignment of the ultrasound transducer 3 with respect to the container 2, a coupling device that supports the ultrasound transducer 3 and holds it on the container 2 is omitted in FIG. 1 and subsequent figures.

In the coupling of the ultrasound transducer 3 to the container 2 that is shown in FIG. 1 and known according to the state of the art, the ultrasound transducer 3 is provided to be rectangle-shaped and comprises planes of symmetry 4a and 4b. The container 2 also has planes of symmetry 5a and 5b that coincide with the planes of symmetry 4a and 4b of the ultrasound transducer 3. An ultrasound signal that is injected into the container 2 by means of the ultrasound transducer 3 propagates with a sound field 6 in a medium 7 within the container 2 (see FIG. 4).

Due to the elasticity of shape of the container 2, which is provided in the form of a solid body, there also propagates an ultrasound wave with a sound field 8 in the form of a transverse wave along the container wall.

Only the ultrasound wave propagating with the sound field 6 serves for determining a filling level h of the medium 7 within the container 2. As is evident from FIG. 4, this wave is reflected within the container 2 at a phase boundary 9, for example the boundary surface between a liquid 10 serving as medium 7 and a gas 11, returns to the site of injection of the ultrasound wave, i.e. the ultrasound transducer 3, where it is received. The filling level h can be calculated from the travel time of this ultrasound wave.

The conventional symmetrical arrangement of the ultrasound transducer 3 and the container 2 shown in FIG. 1 is disadvantageous in that the ultrasound wave propagating with the sound field 8 along the container wall returns to the site of injection of the ultrasound transducer 3 after a single travel around the cylinder-shaped container wall and is received at this site. The ultrasound wave travels around the container wall in opposite directions which is emphasized by depicting bi-directional propagation directions 12 of the sound field 8. Following their single travel over the container wall, both partial waves of the sound field 8 contribute, at the original site of injection, to an increased signal that is received by the ultrasound transducer 3.

The schematic bottom view shown in FIG. 2 of the arrangement shown in FIG. 1 illustrates that the planes of symmetry 4a and 4b of the ultrasound transducer 3, which is provided to be rectangular in shape, and the planes of symmetry 5a and 5b of the cylinder-shaped part 1 of the container 2 are common planes of symmetry. After travelling around the container wall, the sound field 8 propagating along the container wall returns to the ultrasound transducer 3. This is shown in FIG. 2 by the corresponding depiction of the opposite, bi-directional directions of propagation 12. The sound field 8 propagating upwards in FIG. 2 (i.e. in positive Y-direction) therefore returns to the ultrasound transducer 3 from below after single travel around the container wall. The same is true of the sound field 8 that propagates downwards, in that it returns from above to the original site of injection in FIG. 2, i.e. to the ultrasound transducer 3. Since the two sound fields 8 shown in FIG. 2 travel the same distance until returning to the ultrasound transducer 3, they arrive simultaneously at the original site of injection which leads to an increase of the signal received by the ultrasound transducer 3.

The schematic side view shown in FIG. 3 of the arrangement shown in FIG. 1 emphasizes, viewed from yet another perspective, that the planes of symmetry 4a and 5a of the ultrasound transducer 3 and the container 2, respectively, are common planes of symmetry.

The determination of the filling level h of the medium 7 by means of the sound field 6 that is described above by means of FIG. 4 is made significantly more difficult or rendered incorrect, because the sound field 8 propagating along the container wall superimposes over the sound field 6 at the original site of injection or is received by the ultrasound transducer 3 after a travel time that is typical of the sound field 6. The ultrasound measurement yields incorrect filling levels h if the travel time of the sound field 6 is incorrectly included in the determination of the filling level h.

FIG. 5 shows a schematic view of an ultrasound signal 13 that is received by the ultrasound transducer. The depiction shows measured amplitude values (in volt) of the ultrasound signal 13 received by the ultrasound transducer 3 plotted over the time (in arbitrary units) and relates to an ultrasound measurement using the conventional arrangement shown in FIG. 1.

The sound field 8 of the ultrasound wave propagating in the container wall that is received as interfering signal 15 precedes the sound field 6 from the medium 7 within the container 2 that is received and shown as the useful signal 14. The interfering signal 15 and the useful signal 14 have similar amplitudes and are closely spaced in time which is due to the symmetrical arrangement of the ultrasound transducer 3 with respect to the container 2. If, after emission of the ultrasound signal 13, the travel time of the first returning signal 15 is used to determine the filling level h of the medium 7 in the container 2, incorrect filling levels h are determined in the case of the signal profile shown in FIG. 5, since the travel time of the interfering signal 15 incorrectly serves for calculating the filling level h. The profile of the ultrasound signal 13, shown in an exemplary fashion in FIG. 5, illustrates in an impressive manner how desirable it would be to suppress the interfering signal 15 or separate it from useful signal 14.

FIG. 6 shows a schematic three-dimensional view of the cylinder-shaped part 1 of the container 2 to which the ultrasound transducer 3 is coupled from below in an asymmetric fashion according to the invention. FIGS. 7 through 9 show views of the arrangement shown in FIG. 6, whereby FIG. 7 is a bottom view, FIG. 8 is a schematic side view, and FIG. 9 is a schematic front view.

In this context, the planes of symmetry 4a and 4b of the ultrasound transducer 3 in FIG. 6 are different from the planes of symmetry 5a and 5b of the container 2. As a consequence, the sound field 8 of the interfering signal 15 advantageously returns not at all, strongly attenuated or with a clear delay in time to the site of injection, i.e. the ultrasound transducer 3, after single travel of the cylinder-shaped part 1 of the container 2. This is emphasized in FIG. 6 by the propagation direction 12 of the sound field 8 being shown unidirectional. It should be noted that the sound field 6, 8, in particular the orientation of the sound field 6, 8 of the ultrasound transducer, can be defined by the planes of symmetry 4a and 4b of the ultrasound transducer 3.

FIG. 7 shows a bottom view of the arrangement shown in FIG. 6 and illustrates in a comprehensible manner the asymmetric alignment of the ultrasound transducer 3 with respect to the container 2, since the two planes of symmetry 4a and 4b of the ultrasound transducer 3, which is provided to be rectangular in shape, differ from the planes of symmetry 5a and 5b of the cylinder-shaped part 1 of the container 2. Accordingly, the sound field 8 of the interfering signal 15 propagates asymmetric with respect to the planes of symmetry 5a and 5b of the container 2, which leads to the advantages described by means of FIG. 6, such as, for example, attenuation of the interfering signal 15.

The schematic side view shown in FIG. 8 of the arrangement shown in FIG. 6 expresses the asymmetric alignment of the ultrasound transducer 3 with respect to the container 2, viewed from another perspective, by means of the sound field 8.

The sound field 6 of the useful signal 14 shown in the schematic front view of FIG. 9 can be used to determine the filling level h independent of the asymmetric alignment of the ultrasound transducer 3 with respect to the container 2. For this purpose, like in the symmetrical alignment shown in FIGS. 1 through 4, the travel time of the sound field 6 from the bottom side of the container 2 to the phase boundary 9 and back to the ultrasound transducer 3 is determined and used to determine the filling level h.

Figure 10:
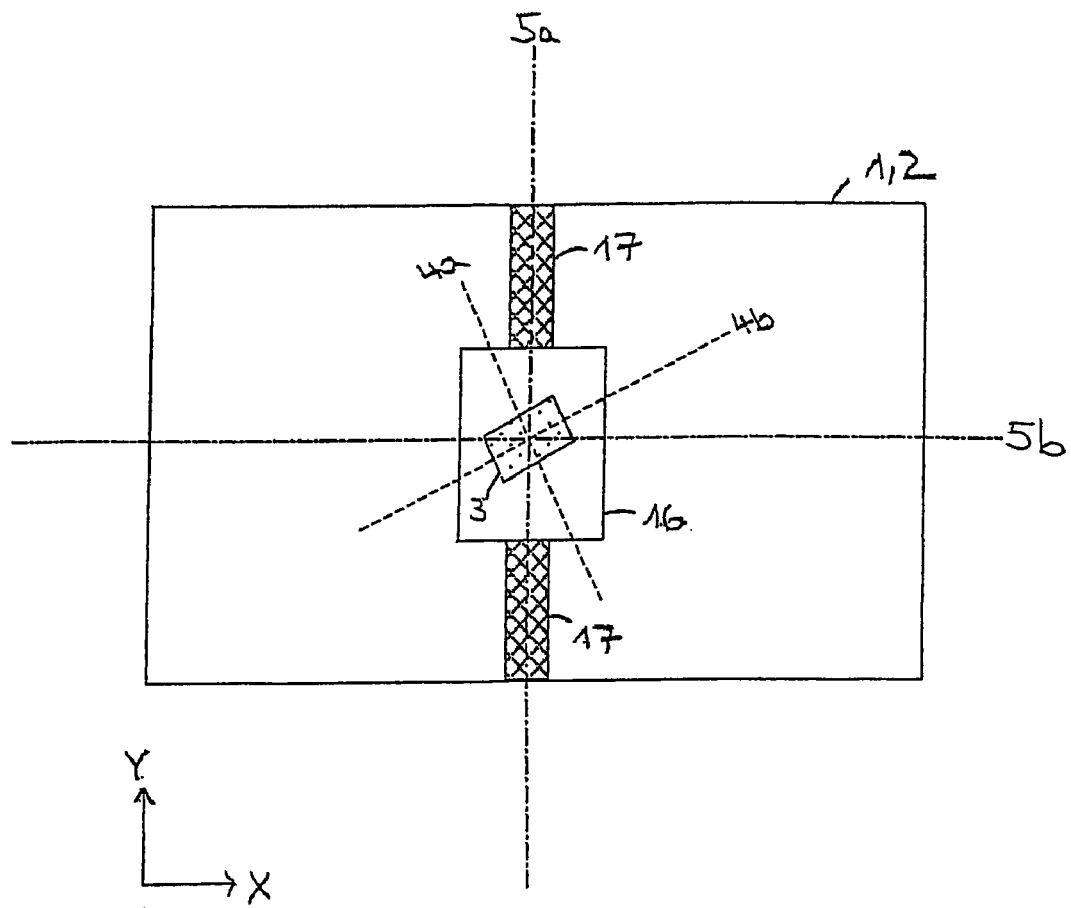
FIG. 10 shows a schematic bottom view of the arrangement according to the invention shown in FIG. 6.

FIG. 10 shows a schematic bottom view of the arrangement shown in FIG. 6. Supplementing the bottom view shown in FIG. 7 of the arrangement shown in FIG. 6, FIG. 10 shows a coupling device 16 supporting the ultrasound transducer 3, with said coupling device 16 coupling the ultrasound transducer 3 by means of a tensioning belt 17 that is tensioned around the cylinder-shaped container 2. A generally known coupling (DE-A-103 31 044) of the ultrasound transducer 3 to the container 2 allows for simple coupling and un-coupling of the ultrasound transducer 3 and thus facilitates the use of the coupling device 16 for ultrasound measurements in changing, different containers 2 that vary in geometry.

Figure 11:
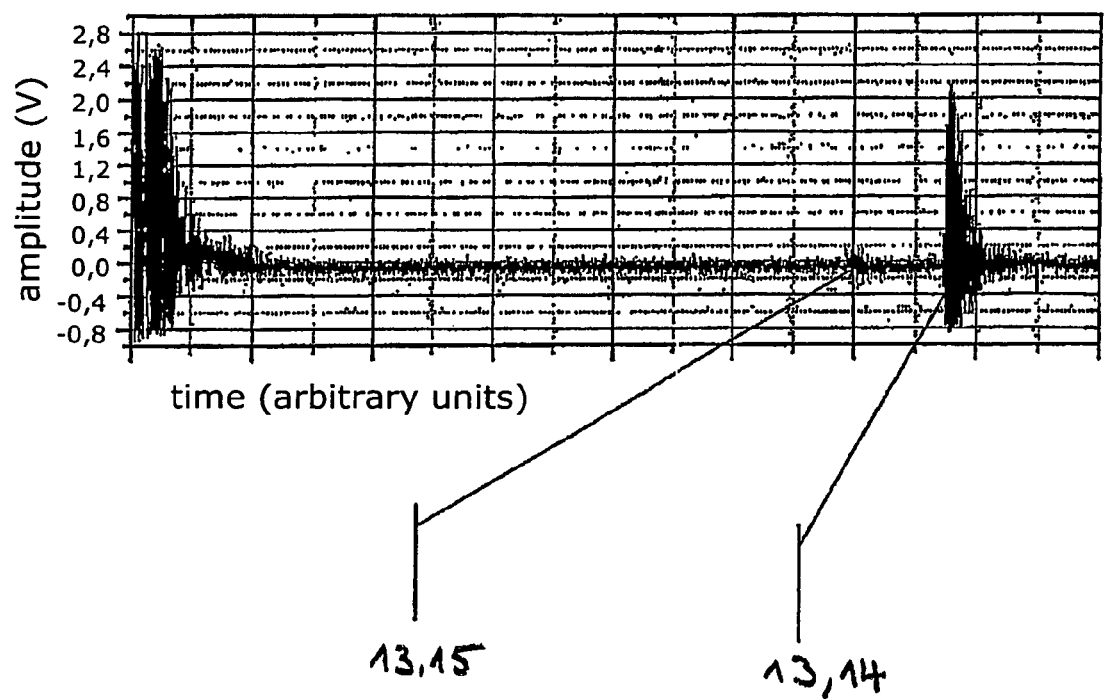
FIG. 11 shows a schematic view of an ultrasound signal of an ultrasound measurement of the arrangement according to the invention shown in FIG. 6.

FIG. 11 shows an ultrasound signal 13, by its amplitude (in volt) plotted over a period of time (in arbitrary units), that was received in an ultrasound measurement by the ultrasound transducer 3 in the arrangement shown in FIG. 6. Due to the asymmetric arrangement according to the invention of the ultrasound transducer 3 with respect to the container 2, the interfering signal 15, which precedes the useful signal 14, is substantially reduced/attenuated with respect to the useful signal 14 and barely detectable. The interfering signal 15 corresponds to the component of the sound field 8 shown in FIG. 7 that returns to the site of injection after single travel around the cylindrical container wall. Due to the asymmetric arrangement, the amplitude of the interfering signal 15 is much attenuated as compared to the amplitude upon a symmetric arrangement as shown in FIG. 5, and in addition it is difficult to distinguish from signal noise. Accordingly, it is highly unlikely that the interfering signal 15 is incorrectly recognized as useful signal 14. This provides for correct determination of the filling level h.

Figure 12:
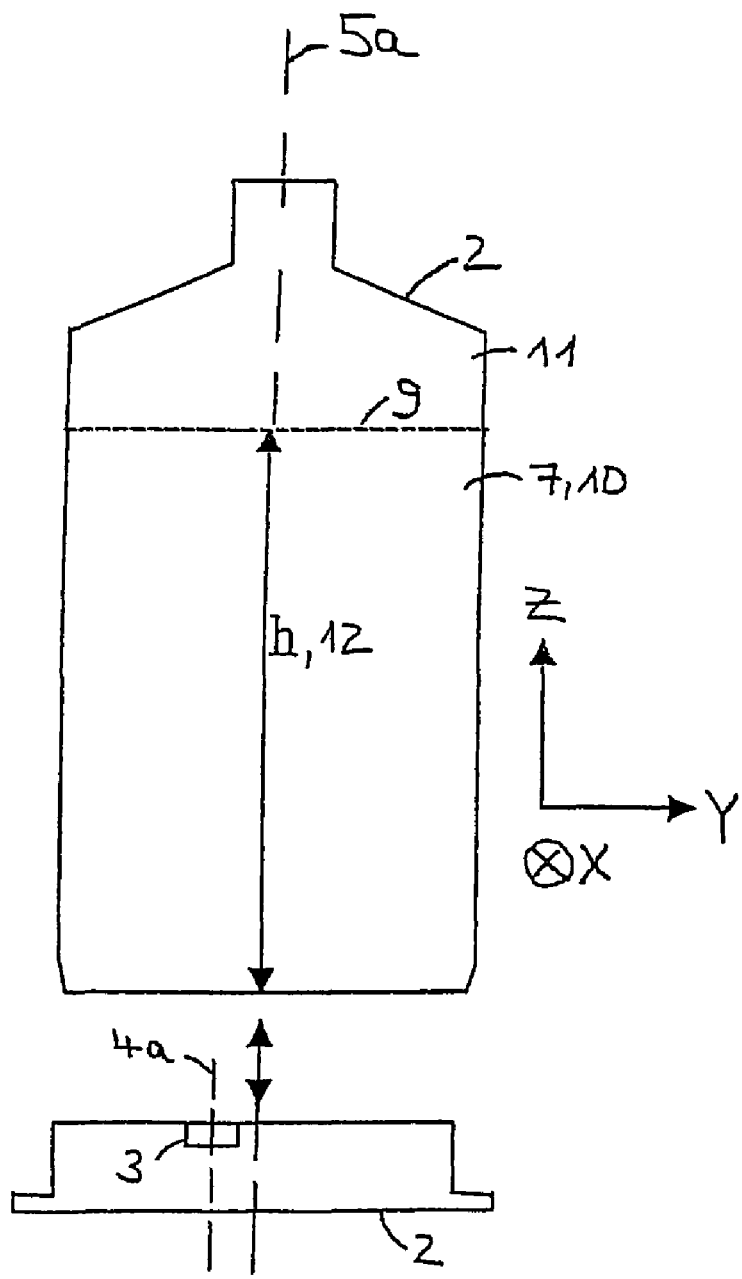
FIG. 12 shows a schematic side view of a container and a coupling facility having an ultrasound transducer.

FIG. 12 shows another embodiment of the invention with the container 2 being provided in the form of a gas bottle whose weight serves to couple it to the ultrasound transducer 3 and to the coupling device 16 supporting the ultrasound transducer 3. The medium 7 is provided in the form of liquid 10 within the container 2 and separated from the gas 11 above the filling level h by the liquid/gaseous phase boundary 12. The alignment of the ultrasound transducer 3 with respect to the container 2, as predetermined by the coupling device 16, leads the ultrasound transducer 3 to have a plane of symmetry 4a that differs from the plane of symmetry 5a of the container 2.

Figure 13:
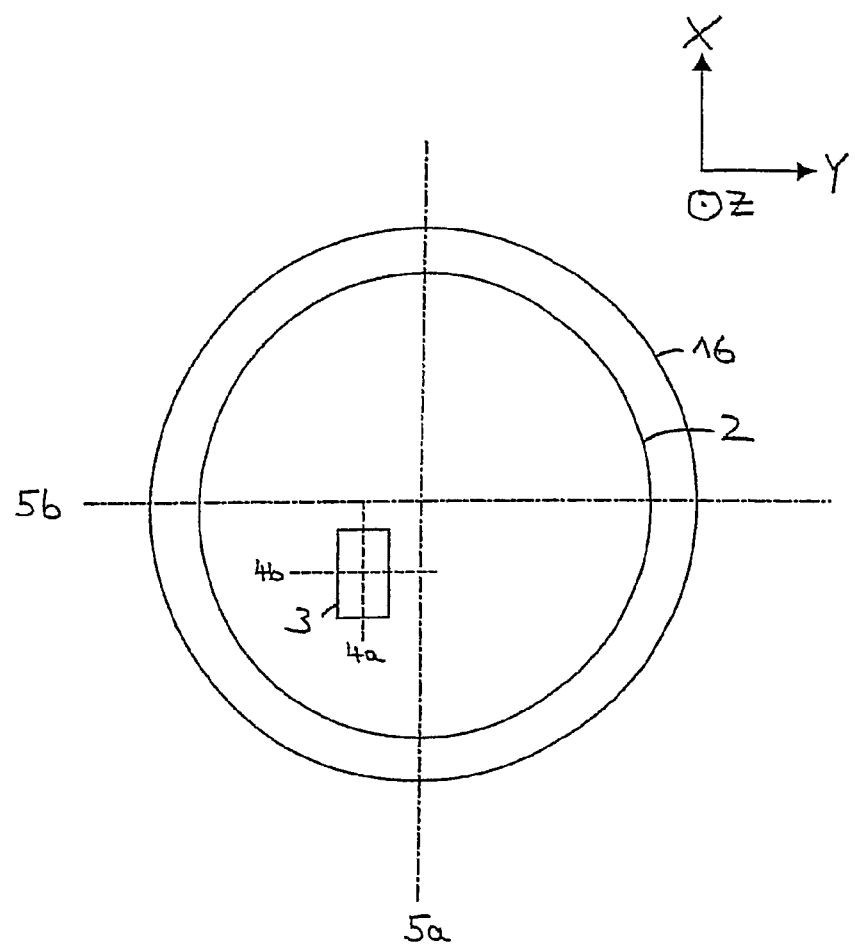
FIG. 13 shows a schematic bottom view of the arrangement according to the invention shown in FIG. 12.

FIG. 13 shows a schematic top view of the arrangement shown in FIG. 12 after coupling of the ultrasound transducer 3 to the gas bottle. Being provided to be rectangular in shape, the ultrasound transducer 3 advantageously is arranged to be asymmetrical according to the invention with respect to the container 2 (gas bottle) by the coupling device 16. This is illustrated by the planes of symmetry 4a and 4b of the ultrasound transducer 3 being different from the planes of symmetry 5a and Sb of the container 2. The asymmetrical alignment leads to advantageous attenuation of the interfering signal 15 that is received by the ultrasound transducer 3 such as is shown and described above, for example, by means of FIGS. 6 through 11.

Having described preferred methods of putting the invention into effect, it will be apparent to those skilled in the art to which this invention relates, that modifications and amendments to various features and items can be effected and yet still come within the general concept of the invention. It is to be understood that all such modifications and amendments are intended to be included within the scope of the present invention.

The invention claimed is:

1. An ultrasound measuring device comprising:
   an ultrasound transducer for emitting ultrasound signals into a container suited to take up a medium, and for receiving ultrasound signals from the container;
   a coupling device supporting the ultrasound transducer for forming a coupling, which is suitable for the transmission of ultrasound, between the ultrasound transducer and an external surface of the container; and having
   an alignment of the ultrasound transducer with respect to the container which is predetermined by the coupling device; whereby
   the ultrasound transducer is a piezo-electrical thickness-mode transducer;
   the surface of the ultrasound transducer comprises two planes of symmetry and is provided to be rectangular in shape;
   the container comprises a cylinder-shaped part;
   the coupling device is provided for coupling the ultrasound transducer to the external surface of the cylinder-shaped part of the container; and whereby
   the coupling device, upon coupling of the ultrasound transducer to the external surface of the cylinder-shaped part of the container, provides for asymmetrical alignment of the ultrasound transducer with respect to the container such that the ultrasound transducer and the container have no plane of symmetry in common.

2. An ultrasound measuring device according to claim 1, wherein the ultrasound transducer and the coupling device have no plane of symmetry in common.

3. Ultrasound measuring device according to claim 1, wherein a fixed alignment of the ultrasound transducer with respect to the container can be produced by gluing the coupling device to the container.

4. An ultrasound measuring device according to claim 1, wherein a fixed alignment of the ultrasound transducer with respect to the container can be produced by means of a coupling device that can be pressed against the container.

5. An ultrasound measuring device according to claim 4, wherein the pressing of the ultrasound transducer against the container can be provided by means of a tensioning belt that surrounds the coupling device and the container.

6. An ultrasound measuring device according to claim 4, wherein the pressing of the ultrasound transducer against the container can be provided by means of clamping the coupling device to the container.

7. An ultrasound measuring device according to claim 1, further comprising:
   a memory facility that can be used to store ultrasound signals in the form of a series of measuring values;
   a comparing facility for various stored ultrasound signals that is provided such that an interfering signal can be determined in the form of a series of measuring values and corresponds to a measuring value component that is common to each of the series of measuring values of the various ultrasound signals that are to be compared;
   an analytical facility that can be used to determine a useful signal by subtracting the stored interfering signal from an ultrasound signal.

* * * * *